Figure 1:
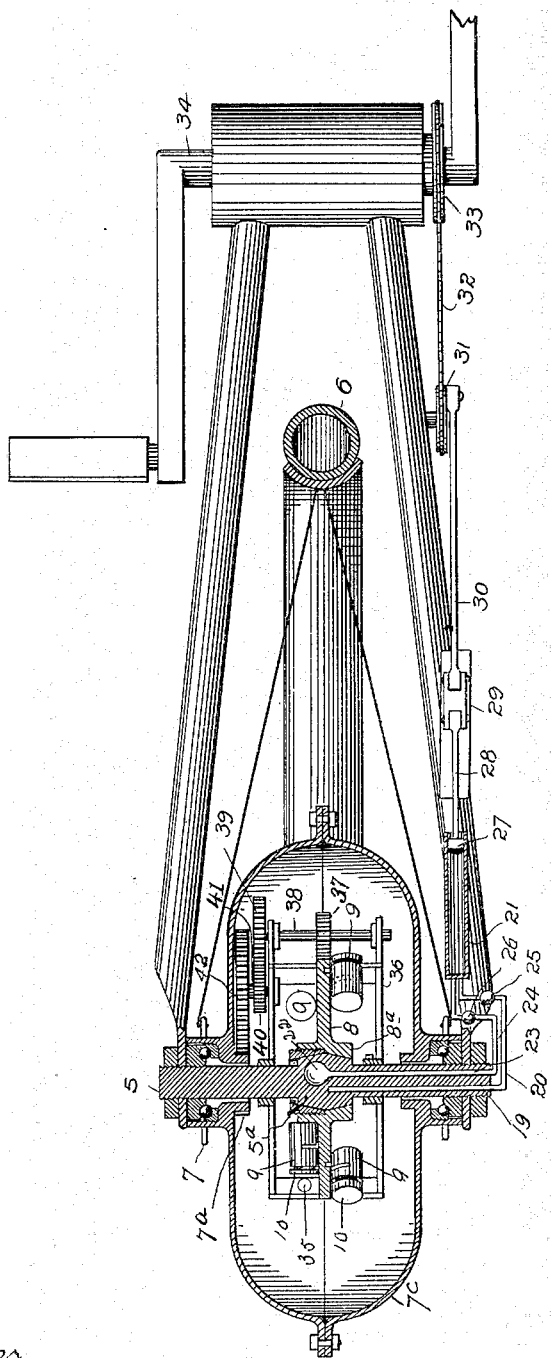

No. 640,284. Patented Jan. 2, 1900.
C. HILL.
HYDRAULIC MOTOR.
(Application filed July 5, 1898.)
(No Model.) 2 Sheets—Sheet 1.

No. 640,284. Patented Jan. 2, 1900.
C. HILL.
HYDRAULIC MOTOR.
(Application filed July 5, 1898.)
(No Model.) 2 Sheets—Sheet 2.
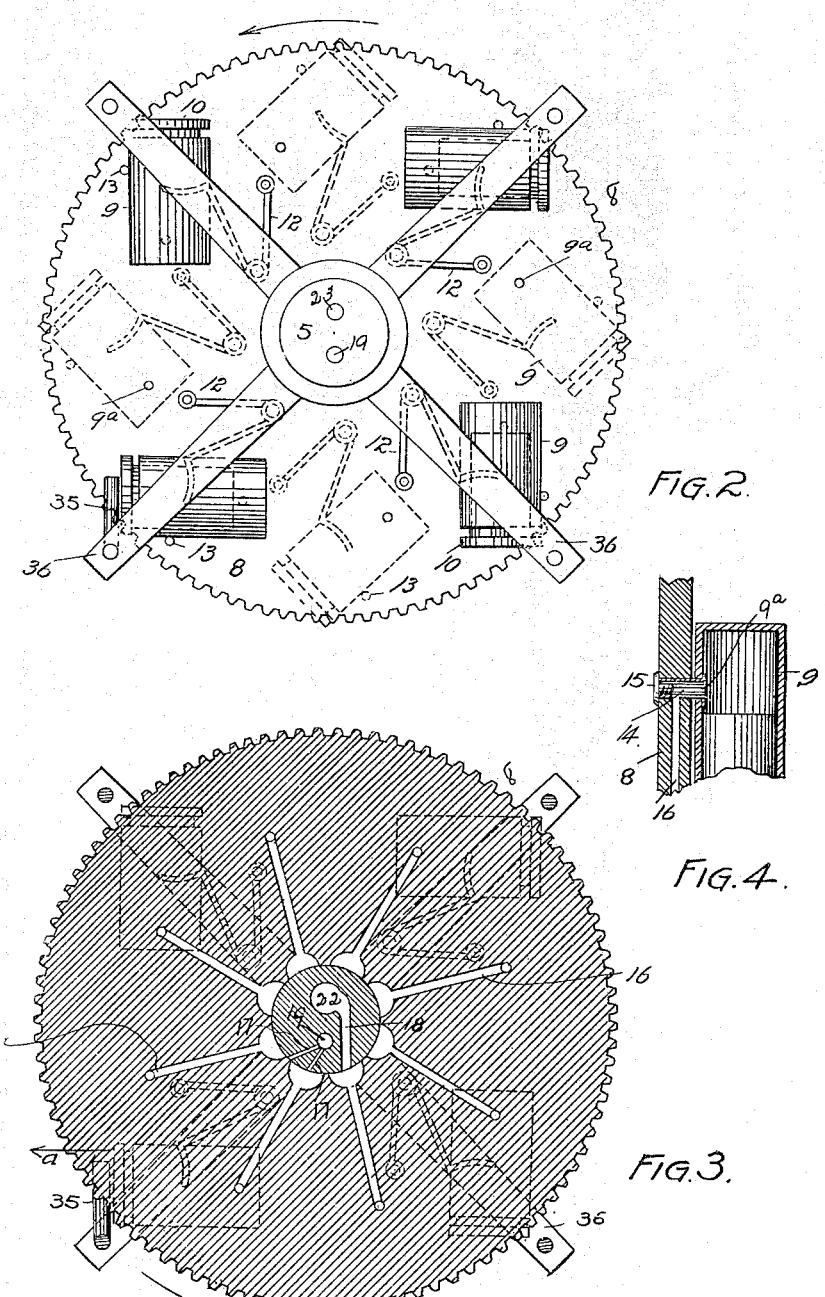

UNITED STATES PATENT OFFICE.

CONSTANTINE HILL, OF DENVER, COLORADO.

HYDRAULIC MOTOR.

SPECIFICATION forming part of Letters Patent No. 640,284, dated January 2, 1900.

Application filed July 5, 1898. Serial No. 685,104. (No model.)

*To all whom it may concern:*

Be it known that I, CONSTANTINE HILL, a citizen of the United States of America, residing at Denver, in the county of Arapahoe and State of Colorado, have invented certain new and useful Improvements in Hydraulic Motors; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in hydraulic motors, my object being to provide a rotary motor of this class which shall be capable of developing great power as compared with the amount expended in its operation.

My improvement in this specification will be described with special reference to its use in propelling bicycles and other velocipedes, though it may be employed to equal and perhaps greater advantage in driving vehicles, railway-cars, ships, and water-craft generally, as well as machinery of all kinds.

Oil is preferably used in operating my improved motor. The liquid employed is forced through the medium of a pump, whose piston is of comparatively small area, into driving-cylinders carrying pistons of greater area, whereby the power gained is proportionate to the ratio between the area of the pump-piston and the area of the driving-pistons. The driving-pistons are mounted on a wheel and are forced out of their cylinders one at a time against a stationary object on the machine to be propelled, thus driving the wheel in a direction opposite the outward movement of the piston. From this motor-wheel motion is communicated to the machine to be operated through the instrumentality of suitable mechanism, whereby any desired speed may be obtained.

The invention will now be set forth in detail and the features of novelty subsequently pointed out in the claims, reference being made to the accompanying drawings, in which is illustrated an embodiment thereof.

In the drawings, Figure 1 is a section taken through my improved motor shown mounted on the shaft or axle of the rear wheel of a bicycle. Fig. 2 is a side elevation of the motor-wheel, shown in detail. Fig. 3 is a section taken through the same. Fig. 4 is a fragmentary view illustrating the manner of mounting the motor-cylinders on the wheel.

Similar reference characters indicating corresponding parts in these views, let the numeral 5 designate the shaft of the rear wheel 6 of a bicycle. The hub 7 of this wheel is mounted on the shaft by means of suitable ball-bearings. Upon the central enlarged portion $5^a$ of this shaft is mounted to rotate the motor-wheel 8. The portion $5^a$ of the shaft is largest at the center, from which it tapers in both directions. One side of the hub $8^a$ of the motor-wheel is shaped to fit the conical part of the shaft, while the other half of the hub is tapped to make room for an exteriorly-threaded nut whose inner surface is made to fit the adjacent conical part of the shaft. The motor-wheel is locked from longitudinal movement on the shaft by this nut, but is adapted to turn freely thereon.

Upon each side of the motor-wheel is pivotally mounted a number of cylinders 9, provided with hollow pistons 10, which are about the same length as the cylinders from which they normally protrude. The cylinders 9 are alternately arranged on opposite sides of the wheel 8. Each cylinder is normally held in a suitable position for the performance of its function by a spring 12. A pin 13 forms a stop, preventing the cylinder from being forced out too far by the pressure of the spring. At a point below the piston 10, when at its inward limit of movement, a port $9^a$ is formed in each cylinder. In this port is inserted and made fast a tube 14, which passes through a hole formed in the motor-wheel 8. The opposite end of this tube is stopped by a screw 15, which prevents the tube from pulling out on the cylinder side.

Within the web of the wheel is formed a passage-way 16, which communicates with the tube 14, whose inner extremity opens into the cylinder below the piston. The tube 14 turns freely in the motor-wheel and forms the pivot for the cylinder. The passage-way 16 extends from the tube 14 to the shaft 5 of the wheel, where it is adapted to register with passages 17 or a passage 18, formed in the enlarged part 5ª of the shaft. The passages 17 lead to a channel 19, extending lengthwise of the shaft 5 and communicating with a conduit 20, leading to the pump-cylinder 21. The passage 18 leads to a chamber 22, formed in the part 5ª of the shaft. From this chamber leads a passage or channel 23 to a conduit 24, which connects with the pump-cylinder 21. The conduit 20 is provided with a check-valve 25, which allows the liquid to pass from the pump-cylinder through the conduit 20 to the passage-way 19, and thence through the passage 16 to a cylinder 9 below the piston.

In the conduit 24 is located a check-valve 26, which allows the oil or other liquid to pass from the chamber 22 into the pump-cylinder by way of the passage 23 and the conduit 24. The pump-cylinder 21 is suitably mounted on the bicycle-frame, and is provided with a piston 27, attached to one extremity of a piston-rod 28, whose opposite extremity is attached to a cross-head 29, suitably supported and operated by a pitman 30, connected with a wrist located outside the center of a pulley 31, which is connected by a belt 32 with a pulley 33, fast on the pedal crank-shaft 34 of the bicycle. As the crank-shaft is rotated the pulley 33 is turned and motion communicated to the pulley 31 by the belt 32, and thence to the piston 27 by the pitman 30 and the piston-rod 28.

Assuming that the pump-cylinder contains oil, as the piston moves outwardly the oil is forced out of the pump-cylinder through the conduit 20, the passage 19, the passages 17, the passage 16, and thence into the motor-cylinder 9 beneath the piston. As the oil enters this cylinder the piston is forced outwardly against a stop 35, mounted on a frame 36, made fast to the stationary shaft 5. As the oil enters the cylinder 9 it acts on the piston 10 with a pressure increased directly as the ratio between the areas of the pistons 27 and 10—that is to say, if the area of the piston 10 is four times that of the piston 27 one pound exerted on the piston 27 will act with a power of four pounds on the piston 10. As the piston 10 is forced outwardly against the stop 35 in the direction indicated by the arrow $a$, the motor-wheel is actuated in the direction indicated by the arrow $c$ until the outwardly-traveling piston 10 has reached its limit of movement. The passages 17 in the shaft 5 are arranged to keep in communication with the passage 16 and the cylinder 9 until the piston of the latter has spent its force. By the time one motor-piston 10 has spent its force, the motor-wheel 8 has moved sufficiently to bring the channel 16 into communication with the exhaust-passage 18 of the shaft. The outer extremity of this exhaust-passage is enlarged to keep in communication with the passage 16 until the cylinder 8 is exhausted of its contents and the piston 10 withdrawn into the cylinder by the partial vacuum thus produced.

As soon as the passage 16, leading to the cylinder whose piston has just acted, has left the passage 17 the passage 16, leading to the motor-cylinder on the opposite side of the wheel, is brought into communication with one of the ports or passages 17. The piston 10 of the corresponding cylinder begins to act on the stop 35 and drives the wheel 8 in the same direction as the first piston, and so on, each piston 10 acting in succession to rotate the wheel 8, the cylinder of the piston which has last acted being exhausted while the oil or other liquid is being forced into the next cylinder.

The outer edge or peripheral face of the motor-wheel 8 is cogged and meshes with a gear 37, fast on a shaft 38, journaled in the frame 36. This shaft 38 is also provided with a gear 39, meshing with a pinion 40, fast on a shaft 41, which also carries a gear 42, meshing with a gear 7ª on the hub 7 of the bicycle-wheel, which is provided with a casing 7ᶜ, inclosing the motor-wheel and its gears. It will be observed that the relative size of the gears may be so arranged as to give the machine any desired speed.

It is evident that as the motor-wheel turns motion is communicated to the wheel 6 through the medium of the train of gears.

From an inspection of the drawings it will be observed that the stop 35 normally lies in the path of each cylinder 9, mounted upon the wheel 8. As any cylinder engages this stop the cylinder yields by virtue of the yielding capacity of the spring 12, allowing the cylinder to pass the stop, when the spring 12 throws the cylinder outward to its normal position, bringing the stop directly in front of the outwardly-moving piston, which is actuated by the liquid driven by the pump in the manner heretofore explained. Hence the cylinders are yieldingly mounted on the wheel 6, and this feature is an important one, since by reason of it the pistons of all the cylinders coöperate with the stop 35 to impart rotation to the wheel.

Having thus described my invention, what I claim is—

1. In a hydraulic motor, the combination of a wheel, a number of motor-cylinders yieldingly mounted thereon, pistons located in said cylinders, a pump, means for conducting liquid driven by the pump-piston to the motor-cylinders in succession, whereby the motor-pistons are driven outwardly, and a stop or its equivalent lying in the path of the cylinders when in their normal position, whereby the cylinders must yield to pass the stop, after which the stop is in the path of the piston moving out of the cylinder, whereby the wheel is propelled in the direction opposite the movement of the pistons.

2. In a hydraulic motor, the combination with a stationary shaft mounted on a suitable frame, of a motor-wheel journaled on the shaft, cylinders yieldingly mounted on the wheel, pistons located in said cylinders, a passage being formed in the wheel leading to each cylinder, an inlet-conduit and an exhaust-conduit being formed in the shaft, the arrangement being such that each passage in the wheel is alternately brought into communication with the inlet and exhaust conduits of the shaft, a pump whose cylinder is connected with the inlet and exhaust conduits of the shaft and a stop or its equivalent located in the path of the cylinders when in their normal position, the cylinders being required to yield in order to pass the stop, after which the latter lies in the path of the outwardly-moving piston of the cylinder.

3. The combination with a stationary shaft and a wheel mounted thereon, of a motor-wheel also mounted thereon, motor-cylinders yieldingly mounted on said motor-wheel, pistons located in said cylinders, a stop or its equivalent lying in the path of the cylinders when in their normal position and in the path of the outwardly-moving piston of any cylinder after the latter has passed the stop by virtue of its yielding feature, passages formed in the motor-wheel and communicating with the motor-cylinders below the pistons, feed and exhaust passages formed in the shaft and adapted to communicate alternately with the passages in the wheel, a pump with which the feed and exhaust passages in the shaft communicate, check-valves allowing the liquid to leave the pump-cylinder in one direction and permitting the liquid to return in the opposite direction, means for operating the pump-piston, and means for communicating motion from the motor-wheel to the wheel to be operated thereby.

4. The combination with a stationary shaft and a wheel mounted thereon, of a motor-wheel also mounted thereon, motor-cylinders yieldingly mounted on said motor-wheel, pistons located in said cylinders, a stop or its equivalent located in the path of the cylinders when in their normal position, but lying in the path of the outwardly-moving piston of a cylinder after the latter has passed the stop, passages formed in the motor-wheel and communicating with the motor-cylinders below the pistons, feed and exhaust passages formed in the shaft and adapted to communicate alternately with the passages in the wheel, a pump with which the feed and exhaust passages in the shaft communicate, check-valves allowing the liquid to leave the pump-cylinder in one direction and permitting the liquid to return in the opposite direction, means for operating the pump-piston, and means for communicating motion from the motor-wheel to the wheel to be operated thereby, comprising a train of gears connecting the last-named wheel with the cogged periphery of the motor-wheel.

5. The combination with a stationary shaft and a wheel mounted thereon, of a motor-wheel also mounted thereon, motor-cylinders yieldingly mounted on said motor-wheel, pistons located in said cylinders, a stop or its equivalent lying in the path of the outwardly-moving piston of a cylinder after the latter has passed the stop by virtue of its yielding capacity, passages formed in the motor-wheel and communicating with the motor-cylinders below the pistons, feed and exhaust passages formed in the shaft and adapted to communicate alternately with the passages in the wheel, a pump with which the feed and exhaust passages in the shaft communicate, check-valves allowing the liquid to leave the pump-cylinder in one direction and permitting the liquid to return in the opposite direction, means for operating the pump-piston, means for communicating motion from the motor-wheel to the wheel to be operated thereby, comprising a train of gears connecting the last-named wheel with the cogged periphery of the motor-wheel, and a casing mounted on the hub of the main wheel and inclosing the motor-wheel and the train of gears.

6. The combination of a stationary shaft having feed and exhaust passages formed therein, a pump communicating with the said passages in the shaft, check-valves for controlling the exit from and the return of the liquid to the pump-cylinder, a motor-wheel provided with passages adapted to communicate at one extremity with the passages in the shaft, cylinders yieldingly mounted on the motor-wheel and having ports communicating with the passages in the wheel, pistons located in said cylinders, and a stop or its equivalent adapted to resist the movement of a cylinder-piston in whose path it lies, after the cylinder has passed the stop by virtue of its yielding capacity whereby the wheel on which the cylinder is mounted is propelled in a direction opposite the movement of the piston.

7. The combination of a stationary shaft having feed and exhaust passages formed therein, a pump communicating with the said passages, check-valves for controlling the exit from and the return of the liquid to the pump, a motor-wheel provided with passages adapted to communicate at one extremity with the passages in the shaft, spring-supported cylinders pivotally mounted on the motor-wheel and having ports communicating with the passages in the wheel, pistons located in said cylinders, and a stationary stop adapted to resist the movement of the piston, whereby the wheel on which the cylinder is mounted is propelled in a direction opposite the movement of the piston.

8. The combination of a stationary shaft having feed and exhaust passages formed therein, a pump communicating with said passages in the shaft, check-valves for controlling the exit from and the return of the liquid to the pump-cylinder, a motor-wheel provided with passages adapted to communicate at one extremity with the passages in the shaft, cylinders pivotally mounted on the motor-wheel and having ports communicating with passages in the wheel, springs mounted on the wheel and engaging said cylinders, pistons located in said cylinders, and a stationary stop, normally lying in the path of the cylinders and adapted to resist the movement of the pistons in succession, whereby the wheel on which the cylinders are mounted is rotated in a direction opposite the movement of the pistons.

9. In a hydraulic motor, the combination of a wheel, a number of motor-cylinders mounted thereon, pistons located in said cylinders, a pump, means for conducting liquid, driven by the pump-piston, to the motor-cylinders in succession, whereby the motor-pistons are driven outwardly, a stop or its equivalent lying in the path of the outwardly-moving pistons, which are successively brought in front of the stop as the wheel rotates, and means for conducting the liquid from the cylinders in succession back to the pump-cylinder, whereby the motor-cylinders are exhausted and the pistons returned to their normal position in the cylinders.

In testimony whereof I affix my signature in presence of two witnesses.

CONSTANTINE HILL.

Witnesses:
A. J. O'BRIEN,
EDITH HIMSWORTH.